A. J. ROBUS.
VERTICAL RETORT GAS APPARATUS.
APPLICATION FILED JUNE 4, 1912.
1,068,452.
Patented July 29, 1913.
4 SHEETS—SHEET 3.
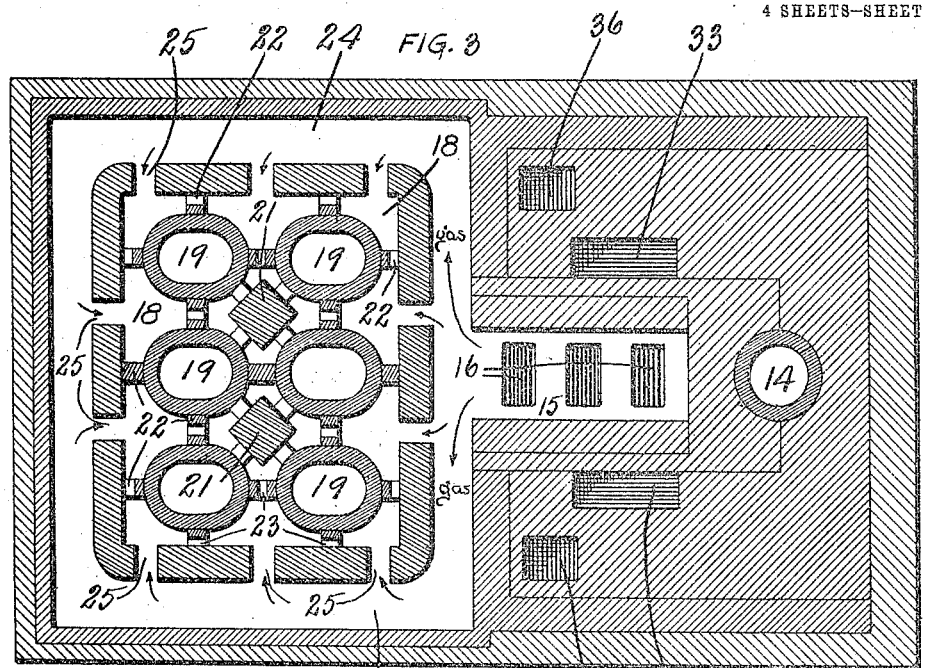
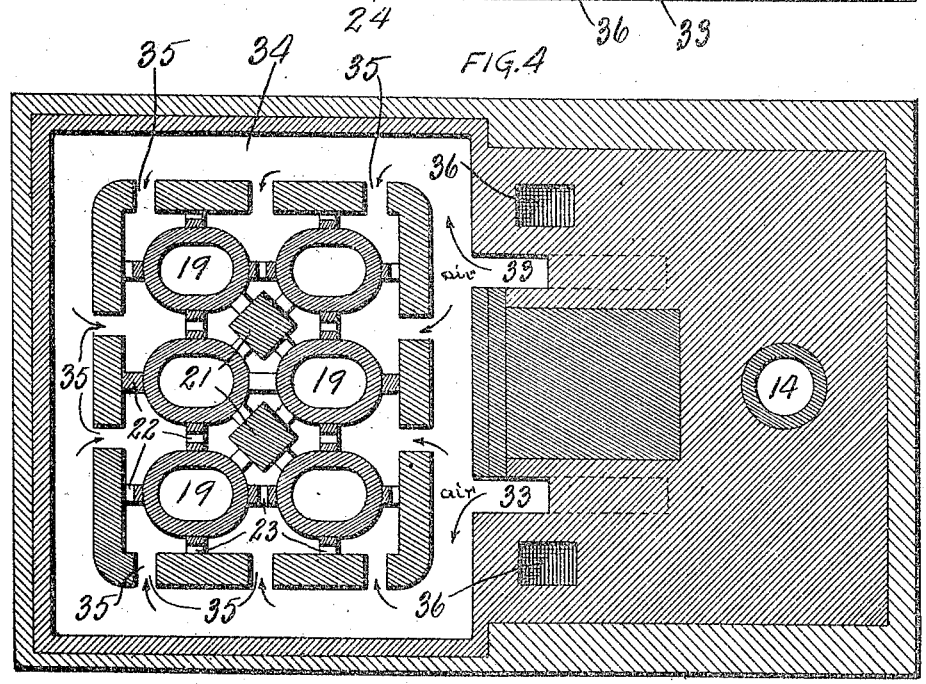
WITNESSES
INVENTOR
ALBERT J. ROBUS
BY ATT'Y.

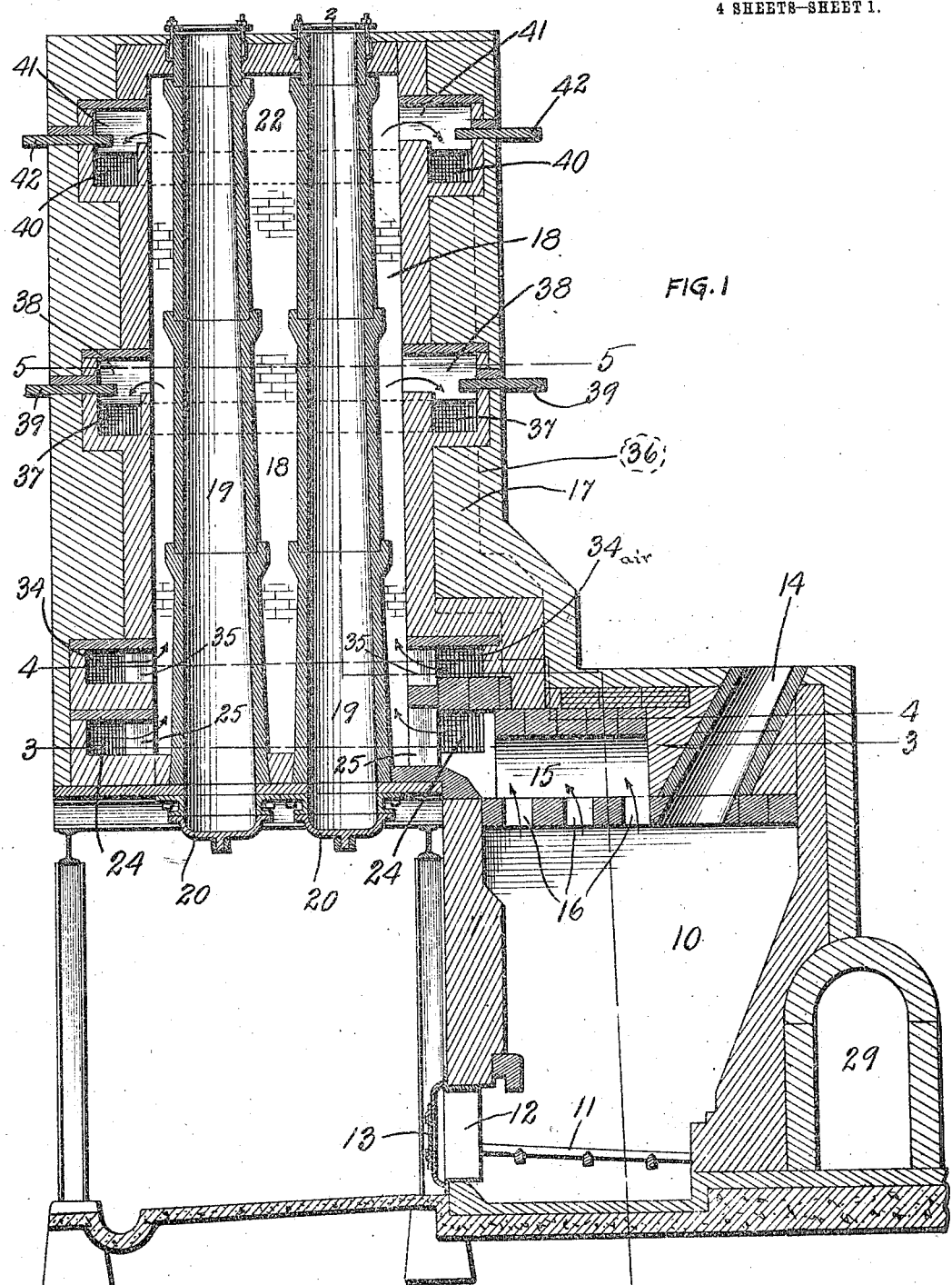

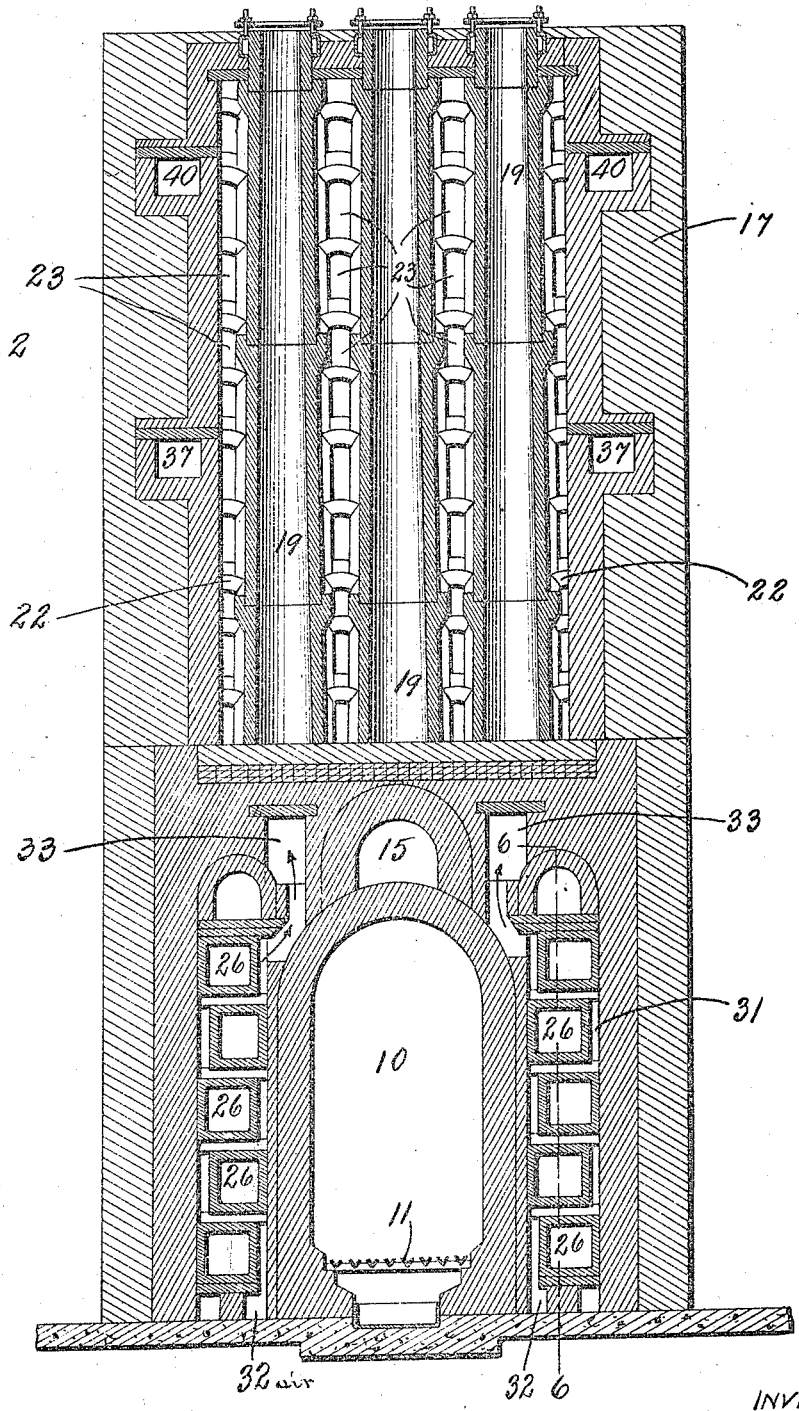

A. J. ROBUS.
VERTICAL RETORT GAS APPARATUS.
APPLICATION FILED JUNE 4, 1912.

1,068,452.

Patented July 29, 1913.
4 SHEETS—SHEET 4.

WITNESSES

INVENTOR
ALBERT J. ROBUS
BY ATTY.

UNITED STATES PATENT OFFICE.

ALBERT J. ROBUS, OF ST. LOUIS, MISSOURI, ASSIGNOR TO EVENS & HOWARD FIRE BRICK COMPANY, OF ST. LOUIS, MISSOURI, A CORPORATION OF MISSOURI.

VERTICAL-RETORT GAS APPARATUS.

1,068,452.

Specification of Letters Patent.

Patented July 29, 1913.

Application filed June 4, 1912. Serial No. 701,576.

*To all whom it may concern:*

Be it known that I, ALBERT J. ROBUS, a subject of the King of Great Britain, residing at St. Louis, Missouri, have invented a certain new and useful Improvement in Vertical-Retort Gas Apparatus, of which the following is a full, clear, and exact description, such as will enable others skilled in the art to which it appertains to make and use the same, reference being had to the accompanying drawings, forming part of this specification, in which—

Figure 5:
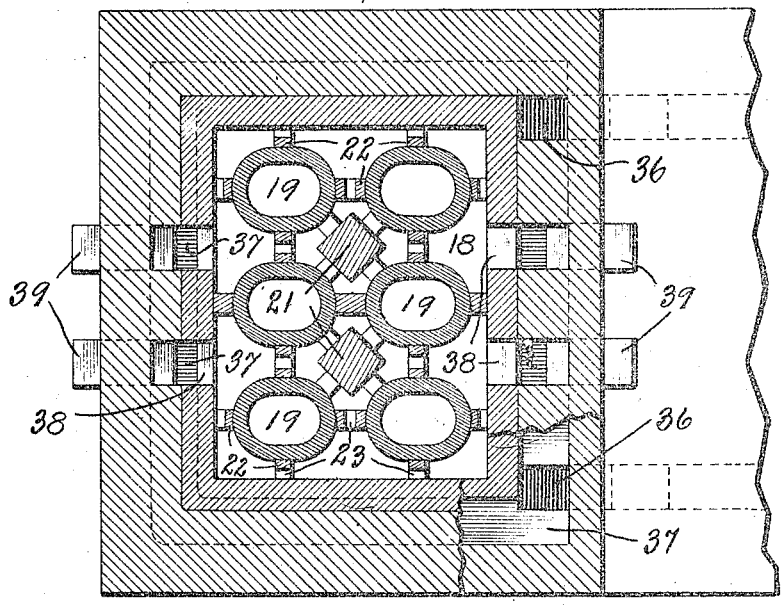
Figure 6:
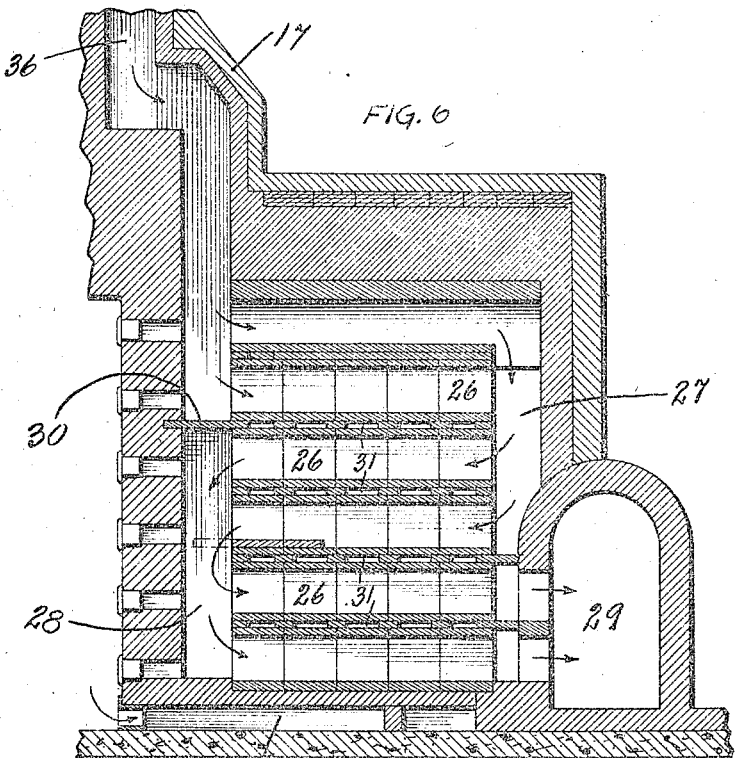

Figure 1 is a vertical section taken approximately through the center of a vertical retort coal gas apparatus of my improved construction. Fig. 2 is a vertical section taken approximately on the line 2—2 of Fig. 1. Fig. 3 is a horizontal section taken approximately on the line 3—3 of Fig. 1. Fig. 4 is a horizontal section taken approximately on the line 4—4 of Fig. 1. Fig. 5 is a horizontal section taken approximately on the line 5—5 of Fig. 1. and Fig. 6 is a vertical section taken approximately on the line 6—6 of Fig. 2.

My invention relates to new and useful improvements in vertical retort benches utilized for the distillation of coal in the production of gas.

The principal objects of my invention are, to generally improve on the existing types of vertical retort benches, to effectively and economically heat the retorts, to provide simple means for controlling the temperature within the retort chamber, and likewise control the off-take or discharge of waste heat and gases from the retort chamber by means of externally operated dampers and slides.

Further objects of my improved invention are, to provide a producer gas collecting chamber that is located between and has communication with the producer furnace and the retort chamber, to provide separate distributing flues for conveying the producer gases and the secondary air to the lower portion of the retort chamber, to provide for the arrangement of the furnaces and recuperators at the back of and below the retort chamber so that the secondary air enters the retort chamber principally by means of induction, and the supply of producer gases being regulated by the primary air control slide arranged on the clinkering door, together with the external dampers in the waste gas off-take flues.

To the above purposes my invention consists in certain new and novel features of construction and arrangement of parts hereinafter more fully described and claimed.

Referring by numerals to the accompanying drawings, 10 designates the furnace or producer provided with the usual grate 11, and primary air inlet opening 12, which latter is located in the clinkering door and controlled by means of a suitable sliding damper 13.

Formed in the top of the furnace setting is an opening 14 through which fuel is introduced. Formed in the top of the furnace setting immediately in front of the opening 14 is a producer gas collecting chamber 15, and leading thereinto from the furnace 10 is a series of openings 16.

The setting 17 in which the retort chamber 18 is formed occupies a position immediately to the rear of and above the furnace, and arranged within the retort chamber is a series of retorts 19 which receive the coal to be distilled. The lower ends of these retorts are supported in any suitable manner and are provided with the usual removable plates or mouth-pieces 20.

The retorts are supported and strengthened on the exterior by means of piers 21 and walls 22, which latter are arranged between the retorts and the walls of the retort chamber, and said supporting and strengthening walls are preferably provided with arched openings 23 in order to permit a free circulation of the burning gases and the products of combustion throughout the entire height of the retort chamber. These piers and walls are provided and arranged so that any pressure on the retorts due to the weight of the charge within said retorts or due to expansion of material will be transmitted to the walls of the retort chamber, thereby preventing said retorts from becoming distorted due to expansion.

The means employed for supporting and reinforcing the retorts within the chamber 18 is fully set forth and claimed in an application for patent filed by me October 1st, 1912, Serial #723,449.

Formed in the lower portions of the walls of the retort chamber is a producer gas distributing flue 24 with which the chamber 15 communicates, and leading from this flue 24 into the lower portions of the retort chamber 18 is a series of inlet openings 25.

The recuperators are located at the sides of the furnace 10, each of which recuperators comprises a series of horizontally disposed waste gas flues 26 formed of square tiles arranged in rows, and the ends of these waste gas flues connect with vertically disposed flues 27 and 28. The lower pair of these flues 26 communicate with the stack opening 29, and by means of baffle plates 30 located in the vertically disposed flues 28 the waste gases entering the recuperators are caused to pass backward and forward through the various flues before entering the outlet to the stack.

Formed between and to the sides of the tiles forming the waste gas flues are secondary air passage ways 31 which receive the secondary air through openings 32 at the bottom of the recuperators. The free ends of these secondary air passage ways communicate with secondary air flues 33, which latter occupy positions to the sides of the producer gas collecting chamber 15, and said secondary air flues 33 lead to a secondary air distributing flue 34 that is formed in the walls around the retort chamber immediately above the producer gas distributing flue 24. This secondary air distributing flue 34 extends around the four sides of the retort chamber, and leading from said flue into the retort chamber is a series of secondary air inlet openings 35.

Leading from the waste gas flues 26 in the upper ends of the recuperators upwardly through the corresponding wall of the retort setting are vertically disposed waste gas flues 36, and formed in the walls of the retort chamber a suitable distance above the secondary air distributing flue 34 is a waste gas collecting flue 37 that communicates with said flues 36. Leading from the central portion of the retort chamber into this collecting flue are waste gas outlets 38, and arranged to slide through the walls of the retort chamber between these openings and the flue 37 are dampers 39. Formed in the upper portion of the retort setting is a second waste gas collecting flue 40, and leading thereinto from the upper end of the retort chamber is a series of outlet openings 41.

Dampers 42 are arranged to slide through the walls between the openings 41 and collecting flue 40 for the purpose of controlling the discharge of waste gases into this flue. This last mentioned waste gas collecting flue 40 communicates with the upper ends of the flues 36.

In operation the retorts 19 are charged with coal from which gas is to be made, and when the furnace 10 is fired the producer gases arising therefrom enter the collecting chamber 15 and pass from thence through the producer gas distributing flue 24 and discharge therefrom through the openings 25 into the lower portions of the retort chamber. The primary air enters the producer furnace through the opening 12, the volume of which primary air is controlled by the damper 13. The secondary air enters the recuperators through the openings 32 and passes upward, back and forth through the passage ways 31 and finally enters the secondary air flues 33. From said flues the secondary air passes into the distributing flue 34 and discharges therefrom through the opening 35 into the retort chamber in a plane just above the point of discharge of the producer gases. The initial combustion of the producer gases and secondary air takes place in the lower portion of the retort chamber, and the heat and products of combustion rise through said retort chamber and circulate through the arched openings in the walls 22. The waste gases are drawn from the upper portion of the retort chamber through the flues 37 and 40, and said gases pass downward through the flues 36 which lead to the recuperators. The waste gases pass from the lower ends of the flues 36 through the upper pairs of flues 26 and from thence backward and forward through the lower flues, and finally discharge into the stack outlet 29. By providing two waste gas collecting flues and arranging the same a suitable distance apart in the upper portion of the retort setting, the waste gases can be drawn off from different levels, thereby controlling the heat within the retort chamber and avoiding undue heating of the upper portion thereof. The waste gases passing through the recuperators provides sufficient heat for the secondary air which passes upward through said recuperators and enters the lower portion of the retort chamber.

By my improved construction the producer gas and secondary air enter the retort chamber at comparatively low velocity, thereby avoiding any undue local heating, and by delivering the producer gases and secondary air into the retort chamber at approximately the same level comparatively long flames are generated during combustion, thereby uniformly heating the retorts to the desired temperature.

By providing two or more waste gas collecting flues and arranging dampers in the same the heat within the upper portion of the retort chamber can be very readily controlled and accurately regulated without the use of baffle plates, and thus the proper degree of heat is maintained with practically an equilibrium, that is, without draft or pressure. Thus the products of combustion pass through the retort chamber at a very low velocity, consequently allowing the heat from said products of combustion to be transmitted through the retort walls and effect a thorough carbonization of the charge within said retorts.

In my improved construction the producer gas collecting chamber is located immediately above the producer gas furnace, and the producer gas distributing flue is extended preferably around all four sides of the lower portion of the retort chamber, and the inlet openings 35 from said distributing flue to the retort chamber provides means whereby the producer gas is delivered equally at all points into the lower portion of said retort chamber. Likewise the secondary air is delivered equally on all sides of the retort chamber immediately above the inlet openings for the producer gas, and thus combustion takes place on all sides of all of the retorts, thereby obtaining an equal distribution of the heat.

In the accompanying drawings I have illustrated a bench of six retorts, but it will be readily understood that a greater or less number of retorts may be used in one setting.

It will be readily understood that minor changes in the size, form and construction of the various parts of my improved retort can be made and substituted for those herein shown and described without departing from the spirit of my invention, the scope of which is set forth in the appended claims.

I claim:

1. In a coal gas apparatus of the class described, a retort chamber, vertically disposed retorts therein, means whereby combustible gases are delivered into the lower portion of the retort chamber, a series of waste gas collecting flues extending around the retort chamber at different elevations, and there being a series of openings from the retort chamber into each collecting flue.

2. In a coal gas apparatus of the class described, a retort chamber, vertically disposed retorts therein, means whereby combustible gases are delivered into the lower portion of the retort chamber, a series of waste gas collecting flues extending around the retort chamber at different elevations, there being a series of openings from the retort chamber into each collecting flue, and means for controlling the passage of waste gases into said collecting flues.

3. In a coal gas apparatus, a retort chamber, a series of vertically disposed retorts arranged therein, means whereby producer gas and air is delivered into the lower portion of the retort chamber, a plurality of waste gas collecting flues extending around the retort chamber, and waste gas outlets leading from the upper portion of the retort chamber at different elevations and communicating with said waste gas collecting flues.

4. In a coal gas apparatus, a retort chamber, a series of vertically disposed retorts arranged therein, means whereby producer gas and air is delivered into the lower portion of the retort chamber, a plurality of waste gas collecting flues extending around the retort chamber, waste gas outlets leading from the upper portion of the retort chamber at different elevations and communicating with said waste gas collecting flues, and means for controlling the discharge of waste gases and products of combustion through said outlets.

5. In a vertical coal gas apparatus, a producer furnace, a retort chamber provided with vertical retorts, a producer gas collector chamber interposed between the furnace and retort chamber external to the latter and having communication with the producer furnace and the retort chamber, a series of waste gas collecting flues leading from the retort chamber at different elevations, and means for controlling the passage of waste gases into said collecting flues.

6. In a coal gas apparatus of the class described, a producer furnace, a retort chamber containing vertical retorts, a producer gas collecting chamber between the furnace and retort chamber external to the latter and having communication with said furnace and retort chamber, means for delivering secondary air into the lower portion of the retort chamber adjacent to the point where the producer gas is delivered into said chamber, and a series of waste gas collecting flues leading from the retort chamber at different elevations.

7. In a coal gas apparatus of the class described, a producer furnace, a retort chamber containing vertical retorts, a producer gas collecting chamber between the furnace and retort chamber external to the latter and having communication with said furnace and retort chamber, means for delivering secondary air into the lower portion of the retort chamber adjacent to the point where the producer gas is delivered into said chamber, a series of waste gas collecting flues leading from the retort chamber at different elevations, and means for controlling the passage of waste gases into said collecting flues.

8. In a coal gas apparatus of the class described, a retort chamber having vertically disposed retorts, a producer gas distributing flue extending around the lower portion of the retort chamber, there being inlet openings from said flue into said retort chamber, a secondary air flue extending around the retort chamber adjacent to the producer gas flue, there being inlet openings from the secondary air flue into the retort chamber, and a series of waste gas collecting flues extending around the retort chamber at different elevations, and means for controlling the passage of waste gases into said collecting flues.

In testimony whereof I hereunto affix my signature in the presence of two witnesses, this 31st day of May, 1912.

ALBERT J. ROBUS.

Witnesses:
M. P. SMITH,
C. S. BUTLER.